United States Patent [19]
Al-Rammah et al.

[11] Patent Number: 6,009,821
[45] Date of Patent: Jan. 4, 2000

[54] DOUBLE BOTTOM HULL FOR TANK SHIP

[75] Inventors: Fouad Abdul Karim Al-Rammah; Thomas J. Scott, both of Dhahran, Saudi Arabia

[73] Assignee: Saudi Arabian Oil Company, Dhahran, Saudi Arabia

[21] Appl. No.: 09/116,053

[22] Filed: Jul. 15, 1998

[51] Int. Cl.[7] .................................................. B63B 3/00
[52] U.S. Cl. ........................................ 114/65 A; 114/74 A
[58] Field of Search ..................... 114/65 R, 65 A, 114/72, 74 A

[56] References Cited

U.S. PATENT DOCUMENTS

| | | | |
|---|---|---|---|
| 1,240,129 | 9/1917 | Fenwick . | |
| 2,454,403 | 11/1948 | Palmieri | 114/65 A |
| 2,715,378 | 8/1955 | Quirin | 114/65 A |
| 3,064,612 | 11/1962 | Gardner et al. . | |
| 3,136,135 | 6/1964 | Rigby et al. . | |
| 3,298,345 | 1/1967 | Pratt . | |
| 3,457,890 | 7/1969 | Rivas et al. . | |
| 3,566,824 | 3/1971 | Cuneo et al. . | |
| 3,895,594 | 7/1975 | Moore | 114/65 A |
| 4,263,862 | 4/1981 | Shepherd | 114/65 A |
| 4,301,006 | 11/1981 | Davis . | |
| 4,359,951 | 11/1982 | Durant et al. . | |
| 4,715,307 | 12/1987 | Thompson | 114/65 A |
| 4,759,397 | 7/1988 | Scott . | |
| 5,160,215 | 11/1992 | Jensen | 404/46 |

FOREIGN PATENT DOCUMENTS 59-184084  10/1984  Japan .

*Primary Examiner*—Stephen Avila
*Attorney, Agent, or Firm*—Abelman, Frayne & Schwab

[57] ABSTRACT

A new tank ship, or an older ship which might not otherwise be economically retrofitted to comply with current regulations, is provided with a double hull requiring essentially no internal steel structural support by distributing and compacting sand in the bottom of the tank or cargo hold, applying a layer of reinforced concrete to the sand, laying steel plates on the surface of the cured concrete and welding the abutting edges of the plates to the hull, interior bulkheads, and to each other, to form a second fluid-tight bottom in the tank. The construction method can be used to retrofit older tankers to comply with Regulation 13G of MARPOL.

29 Claims, 4 Drawing Sheets

DOUBLE BOTTOM HULL FOR TANK SHIP

FIELD OF THE INVENTION

The invention relates to the construction and retrofitting of a second bottom in a tank or other cargo ship's hull for the purpose of eliminating or reducing the amount of polluting liquid cargo that may be discharged into the water in the event of a failure of the ship's primary outer hull. More particularly, the invention relates to the retrofitting of older existing single hull oil tanker vessels to comply with Regulation 13G of MARPOL 73/78 Annex I, adopted as a measure intended to reduce the damaging effects on the marine environment of pollution resulting from shipping casualties.

BACKGROUND OF THE INVENTION

In an effort to eliminate, or to at least minimize, the potential damage to the marine environment caused by oil spills, the International Maritime Organization (IMO) in 1992 adopted new regulations concerning the construction and requirements for the retrofitting of oil tankers. From 1993 onwards, new tanker vessels must be built with a double hull or equivalent arrangements. Tanker ships built prior to 1993 are governed by Regulation 13G of MARPOL 73/78 and must be fitted with a specified double hull or equivalent arrangement when they reach 25 or 30 years of age. It has been estimated that the total number of tankers that continue to transport liquid petroleum cargos is in excess of 2,000, and well over one half of that number were built prior to 1980. Therefore, a significant number of the world's older tanker fleet must meet the requirements of Regulation 13G in order to continue to operate after their 25th year.

MARPOL Regulation 13G mandates that the non-cargo carrying spaces of the tankers in the ultra-large and very large crude carrier U/VLCC category must cover at least 30% of the side of the ship for the total cargo tank length and be at least 2 meters in height, or cover at least 30% of the projected bottom area of the total cargo tank length and have a depth of at least 2 meters or one-fifteenth (1/15th) of the beam of the ship, whichever is less.

Various alternatives have been proposed for meeting the requirements of Regulation 13G. One option is to designate selected cargo tanks as non-cargo carrying spaces. In other words, these tanks will no longer be used for cargo or for ballast. Although this is a relatively simple approach to compliance in one respect, this approach has a significant economic impact since about 20% of the ship's cargo-carrying capacity is lost. In selecting the tanks which are to become non-cargo carrying spaces, care must be taken to insure that the remaining tanks can be loaded for both ballast and cargo that meet conditions that are within the prescribed limits for longitudinal bending moment and sheer forces. As a practical matter, additional cargo space may be lost in order to meet these safety and engineering requirements or, alternatively, expensive bulkhead modifications will have to be undertaken. Additional costs will be incurred in order to insure compliance, e.g., blind flanges will have to be installed in order to insure that the designated tanks are not inadvertently loaded; existing vents and pumps will also have to be maintained to be used in the event of an emergency.

Another option is to provide segregated ballast tanks (SBT) or dedicated clean ballast tanks (DCBT) in order to meet the 30% side or bottom protective location requirements. Although the conversion cost of this alternative is relatively low, the loss of cargo capacity and the attendant reduction in income can amount to several millions of dollars per year at current freight rates for a VLCC tanker.

Another approach to meeting the requirements of Regulation 13G is to install bulkheads to provide the coverage over 30% of the sides and bottoms, with an estimated loss in cargo capacity of about 2.2%. However, the cost of retrofitting a VLCC with bulkheads is estimated to be about $20 million.

One other means of compliance with Regulation 13G is the use of hydrostatically balanced loading techniques. Using this method, the cargo is loaded in all cargo tanks to a level that is less than the freeboard, so that at the cargo tank bottom the hydrostatic pressure of the cargo oil column plus the inner gas pressure in the ullage space remains equal to, or less than, the hydrostatic pressure of the outside water column, thereby mitigating the outflow of oil in the case of bottom damage. Since the hydrostatically balanced loading technique requires no alteration to the ship's structure, pumping or piping systems, the conversion costs are very low. However, the reduction in cargo carrying capacity calculated on an annual basis can result in a loss of about $4 million in freight revenues. In addition, the transport of cargo in partially filled tanks raises the possibility that the natural period of the partial cargo resonating with the nature period of ship motions in a seaway could create substantial sloshing forces and the attendant risks to navigation and to the structural integrity of the ship itself.

Thus, based upon the various analyses that have been undertaken by, or on behalf of the industry, each of the above alternatives proposed for complying with Regulation 13G will incur either very high initial costs, or relatively high annual losses in freight revenues.

It is therefore an object of this invention to provide a construction and method of fabricating a double bottom ship's hull that complies with current regulations, and specifically with MARPOL Regulation 13G, which minimizes the loss in cargo capacity as a percentage of the overall capacity of the ship, thereby minimizing the loss in freight carrying revenues, while also being less expensive over the useful life of the ship than other proposed alternatives.

It is another object of this invention to provide a method of constructing a double hull in an existing oil tanker that will result in a construction that is in compliance with current maritime regulations governing the operation of oil tankers that were constructed more than 25 years ago.

It is yet another object of the invention to provide a method of retrofitting an existing U/VLCC that can be completed relatively quickly and at a relatively low cost.

Another object of the invention is to provide a completed construction and a method for retrofitting existing oil tanker hulls with a double bottom that employs inexpensive, readily available materials which can be fabricated and installed with relative ease, taking into account the confined space and existing structures in the hold of the ship.

SUMMARY OF THE INVENTION

In its broadest concept, the invention contemplates the installation in the bottom of the ship of materials having high specific gravity that increases the ship's light weight to meet the regulatory ballast requirements, and at the same time provides the ship with the required 30% bottom protection at a minimum loss of tank space and deadweight. In one preferred embodiment, sand is distributed in the selected tank bottoms up to a depth of two meters or 1/15th of the beam of the ship, which ever is less, after which the sand is compacted and covered by a layer of concrete to insure its integrity and to prevent it from shifting. Once the concrete has cured, a steel plate, or plates, are placed on top of the concrete and welded to the existing structure of the ship, and where multiple plates are used, to each other. Thus, a double bottom hull construction in accordance with the invention comprises a layer of sand of prescribed depth placed in the ship's outer hull that is completely covered by a layer of concrete, the latter being isolated from the cargo by a cover of steel plate that is closely fitted and welded to the ship's hull, the tank bulkheads and any other structural members which penetrate the surface of the concrete.

In a preferred embodiment of the invention, conventional steel reinforcing members are placed in the concrete layer using well-established methods and materials. In a further preferred embodiment, a seal fabricated from a resilient polymeric material that forms a barrier to, and is not degraded by petroleum products. The seal is placed between the vertical hull and along the interior bulkheads at the junction with the reinforced concrete to thereby prevent the concrete from directly contacting the metal surfaces of the ship's hull, bulkheads or other structural members. Where the dimensions of the reinforced concrete layer would produce significant horizontal expansion forces, the layer is provided with expansion joints in accordance with standards established for conventional reinforced concrete constructions.

In order to facilitate and expedite the installation and the practice of the method of the invention, peripheral supporting strips are secured to the ship's hull and tank bulkheads along a line that is even with the surface of the cured concrete. These peripheral supporting strips, or backing strips, are of the same or a similar metallurgical composition as the ship's hull. The strips can be welded in place and extend outwardly a distance that is sufficient to engage the underside of the edges of the steel plating placed on the concrete. These supporting strips also facilitate the formulation of a fluid-tight weld between the steel plating and the tank walls and any other members projecting through the concrete.

In the practice of the invention, the existing configuration of the tanks are analyzed in the context of the requirements of current maritime regulations governing the retrofitting of the hull with a double bottom. Once the tanks, or portions of the tanks that are to be outfitted with a double bottom have been identified, the tanks are emptied and cleaned, a portion of the requisite amount of dry sand is loaded into the bottom of the tank against the hull. A first layer of sand is spread and compacted, as by tamping. Depending upon the area of the floor of the tank, some or all of the tamping can be accomplished using powered hand equipment. The use of larger pieces of mobil tamping equipment will be precluded by the presence of anti-sloshing baffles in the tanks. After the first layer of sand has been tamped, one or more additional layers are placed in the tank and each layer is compacted to provide a dense substrate that is free of voids up to the required depth, which under current regulations is two meters.

The compacted sand is then prepared for receiving a single stab, or for larger areas, a grid layer of reinforced concrete slabs. Water and oil resistant sealing material is placed against the hull, bulkheads, baffles and between any of the adjacent concrete slabs forming the grid and any other structural members projecting from the surface of the sand. The sealing material also serves as expansion joint material. If a large area is to be covered with concrete, vertical forms will be temporarily installed during a pour. After the form or forms are removed, expansion joint material is positioned on the sand and the adjacent concrete section is poured. Steel reinforcement members are also put into position using standard construction techniques. The reinforcing material can take the form of steel bars (rebar), a steel mesh, or a combination of rebar and mesh. In a preferred embodiment, the concrete is poured to a depth of about 150 millimeters, i.e., about 6 inches, and worked to provide a smooth even surface. The concrete is then allowed to cure in accordance with industry standards, such as that set forth in ASTM C125-97 and the other documents referenced therein.

After the concrete has cured, steel plating is laid on the surface of the concrete and welded to the ship's hull, bulkheads and any other structures projecting through the concrete in order to form a fluid-tight junction. In a preferred embodiment, the peripheral supporting strips serve as a guide to leveling the surface of the wet concrete to the desired height and to insuring a fluid-tight weldment around the edges of the steel plating.

Depending on the size and/or configuration of the hold, more than one plate can be installed. All of the seams or joints between the plates are welded to provide a fluid-tight seal and a joint that will withstand the pressure of the cargo and the stresses associated with the movement of the cargo and the ship. The steel plate can be a mild steel that can be cut with relative ease to abut the adjacent steel surfaces with which it is to be welded. The plate can be from 5 mm to about 30 mm in thickness. Since the structural components of the ship are fabricated from the same, or material similar to that used for the steel plate, these materials will have a similar coefficient of expansion within the expected temperature range of 0° to 45° C. The resilient oil resistant sealing and expansion joint material will accommodate expansion/contraction of the reinforced concrete layer.

In a particularly preferred embodiment, the depth of the dry compacted sand will be about two meters or one-fifteenth ($\frac{1}{15}$) of the ship's beam, whichever is less, the latter being prescribed by Regulation 13G of MARPOL. For the purposes of this description, the overall thickness of the compacted sand layer will be referred to as about two meters, which represents one preferred embodiment that would put a retro-fitted tanker in compliance with existing international maritime regulations. However, it is to be understood that the depth or thickness of the compacted sand layer placed against the bottom and side walls forming the hull of the ship can be greater or less than two meters.

The thickness of the cured reinforced concrete slab can range from 150 mm to 300 mm. The concrete can contain aggregate and is of the high density type as defined by the relevant ASTM. Care must be taken to insure that the concrete is properly cured and has reached its required hardness before installation of the steel plates or decking is commenced.

The steel plate has a high tensile strength, and can be of a mild plow or other steel/iron alloy of a type used in ship construction. The thickness of the steel plate can range from 5 mm to 30 mm, and the specific thickness will be determined by calculations within the ordinary skill of the art based upon the hydrostatic pressure, which in turn is calculated based upon the cargo, the size of the tank, and other static and dynamic factors well-known to marine architects and engineers. The steel plates are installed in abutting relation to the inside surface of the hull, the vertical walls of the cargo hold, or tank, and any other vertical members projecting through the surface of the concrete layer, such as tank baffles, pipes or pipe chases, or structural members. In the case of projecting members having complex shapes or contours, the installation of the steel plate can be facilitated by constructing a housing or other shield around the member. The irregular shapes or contours can be cut into the steel plates from patterns at a remote location, or by using cutting tools and/or torches on the site at the time of installation in the cargo hold. It is important that the steel plates be installed in closely abutting relation to the vertical surfaces in order to insure that a strong, fluid-tight weld can be obtained for the cargo hold.

In its broadest aspect, the invention contemplates a method of providing a second bottom to a cargo hold in a steel hull ship, said second bottom being supported without a steel structure, the method comprising:

a) applying a first layer of sand to the bottom of the ship's cargo hold over an area that is to be covered by a second bottom;

b) compacting the first layer of sand;

c) applying one or more additional layers of sand to the first layer of compacted sand;

d) separately compacting each of the one or more additional layers of sand after the layer has been applied;

e) applying a layer of reinforced concrete to the uppermost layer of compacted sand;

f) placing one or more steel plates on top of the cured layer of reinforced concrete and in abutting relationship with the side walls of the cargo hold, and/or with each other; and g) welding the one or more steel plates to the side walls of the cargo hold, and/or to each other in fluid-tight relation, to thereby provide a second bottom capable of supporting and retaining cargo placed in the cargo hold.

In the case of retrofitting an existing oil tanker, it will be necessary to make provision for the pipes and bellmouth openings for filling and discharging the contents of the tank. Existing pipes and fittings located close to the bottom hull of the ship in the cargo hold can be sealed off and abandoned, with new piping installed above the level of the second bottom. Alternatively, a suction well or box can be constructed extending vertically from the existing bellmouth to a height above the new second bottom, so that the new floor of the cargo hold will be in fluid communication with the original piping.

DESCRIPTION OF PREFERRED EMBODIMENTS

Figure 1:
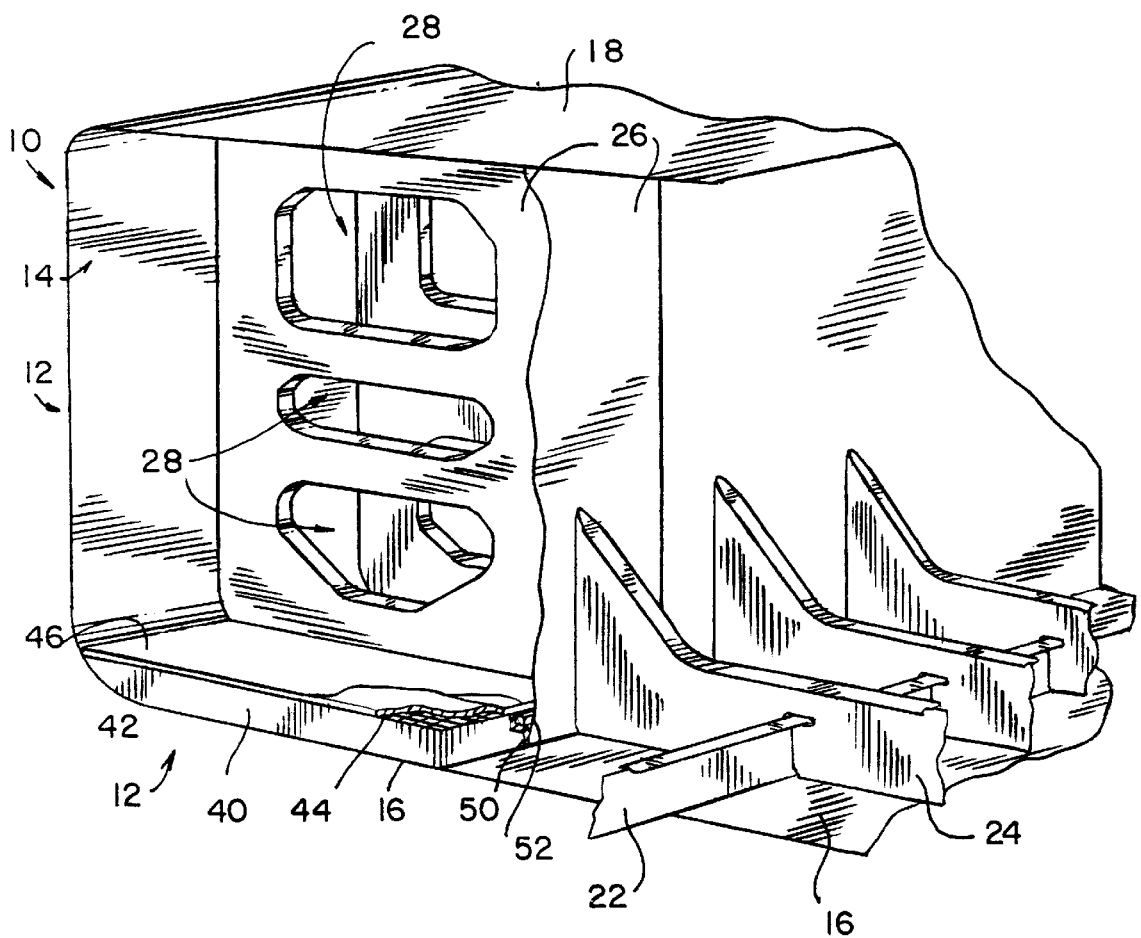
FIG. 1 is a schematic cross-sectional view in perspective showing a portion of a cargo hold and adjacent area of a tank ship.

With reference to FIG. 1, there is schematically illustrated a portion of a cargo hold with construction that is representative of a wing tank in a VLCC typically employed to transport crude oil or refined petroleum products. The cargo hold, or tank, 10 as shown is formed with vertical side walls comprising side plate 14 of hull 12, longitudinal interior bulkhead 20 and transverse bulkhead 21. Also positioned in the cargo hold of the liquid tanker are transverse web frames 26 with openings 28 which serve to minimize the movement of the liquid cargo in response to the changes in direction, speed or sea movement of the ship. The bottom of the cargo hold is formed from the bottom section 16 of hull 12 and the top of the hold or tank is provided by the upper deck 18. Also shown in FIG. 1 are representational longitudinal structural member 22 and transverse structural members or web frame 24 which serve to reinforce the hull and cargo holds of the ship. Similar structural members (not shown) are found in the cargo holds. As shown in the structure of FIG. 1, the bottom of the cargo hold or tank 10 is provided with a layer of compacted sand 40 that is placed in contact with the hull bottom 16, a layer of reinforced concrete in the form of a slab, or grid slabs 42 on top of sand layer 40, and finally a continuous metal plate 46 which rests on the surface of the reinforced concrete 42. Also illustrated in the sectioned view is concrete reinforcement 44.

Figure 2:
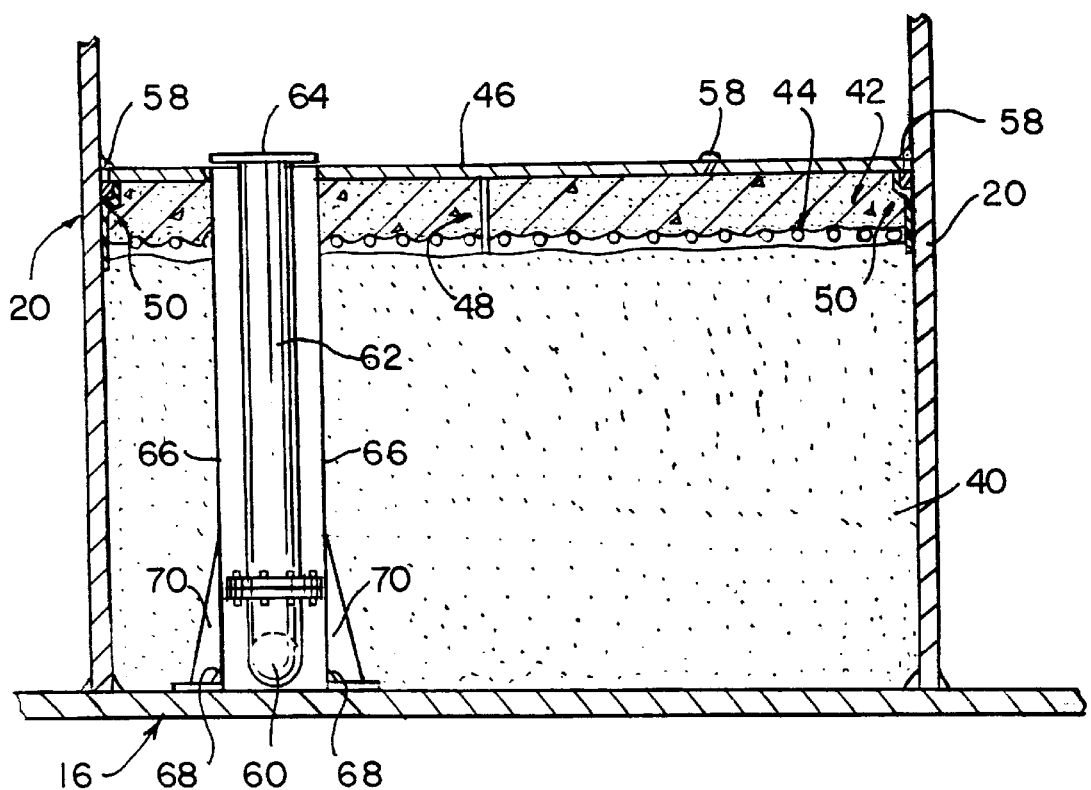
FIG. 2 is a vertical cross-sectional view schematically illustrating one preferred embodiment of the invention in a ship's cargo hold.
Figure 3:
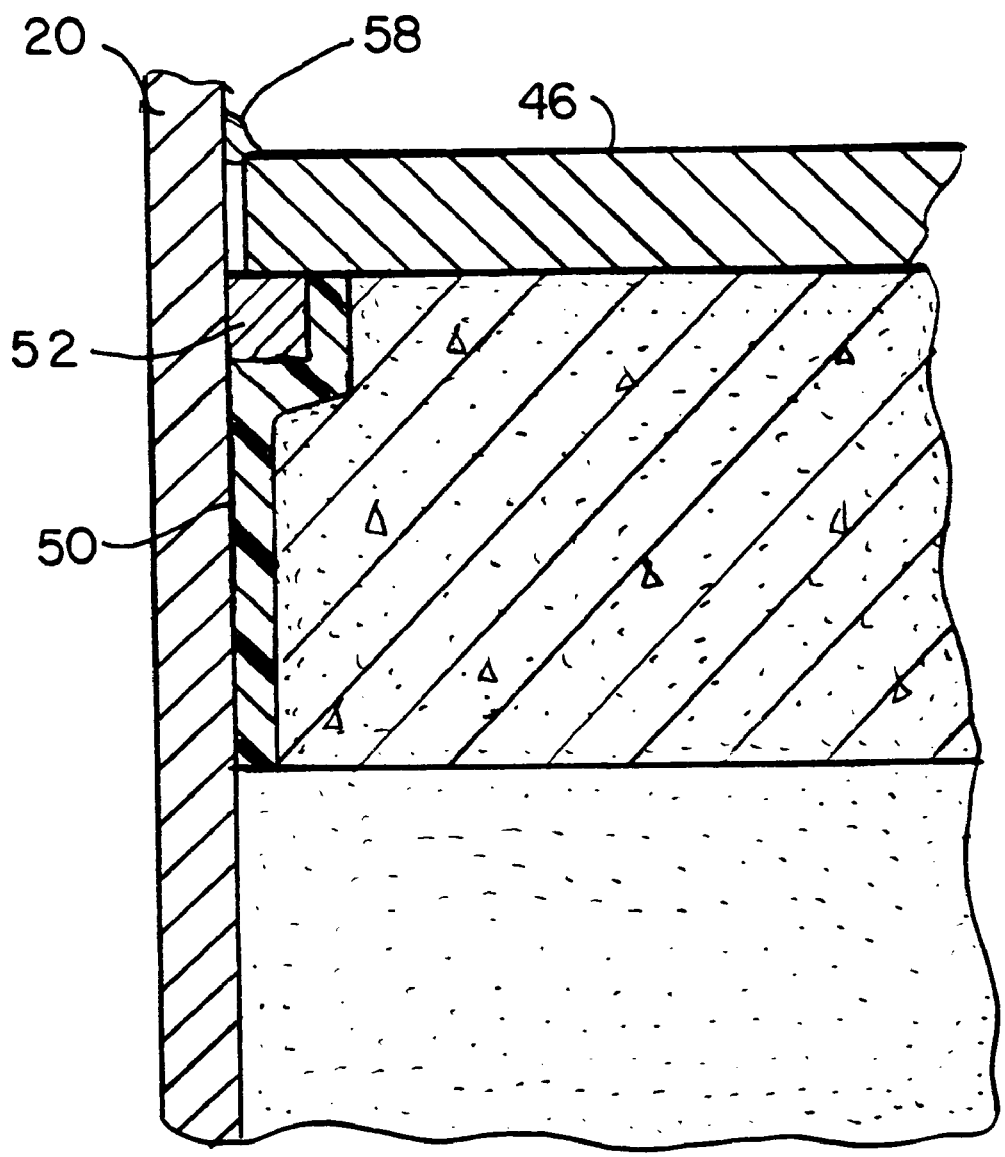
FIG. 3 is an enlarged portion of FIG. 2 identified as III.

Another embodiment of the invention is shown in the cross-sectional view of FIG. 2. The compacted sand layer 40 is shown in place on hull bottom 16 and between interior vertical bulkheads 20. The sand layer is topped by a layer of concrete 42 containing reinforcing material 44, which can take the form of rods, welded steel mesh, or a combination of both. The concrete is provided with vertical expansion joints 48 of resilient material that are put in place when the concrete is poured. As best shown in the detail of FIG. 3, a seal 50 fabricated from an impervious, oil-resistant polymeric material, such as foamed or expanded neoprene, is positioned between the concrete and the wall surface and backing strip 52. Seal 50 extends around the periphery of the compartment and serves both to isolate the concrete and prevent its abrasive contact with steel structural members and also to provide an additional area for expansion of steel and/or concrete. As will be seen from FIG. 3, the lower end of seal 50 terminates in sand layer 40, so that any dimensional changes in the shape and size of the seal can be absorbed by the deformation of the sand.

Also shown in cross section in FIG. 2 and in the detail of FIG. 3, are peripheral support strips 52 that are placed between the edges of the concrete slab 42 and the sidewalls 20. The peripheral support strip 52 is preferably fabricated from the same type of steel as plate 46, which is the same as, or similar to the structural steel of the ships's hull. In a preferred embodiment of the method, strip 52 is secured to the hull or bulkhead surface, as by welding, before the concrete is poured. The upper horizontal surface of strip 52 is at the same height as the surface of the cured concrete 42, and can advantageously be used as a guide during the leveling and smoothing of the wet concrete to ensure that it is of the proper height to support the steel plating. Strip 52 can be of a square, rectangular or other appropriate cross-section, and can be welded to the hull or other vertical surface. A square strip, 10 cm on a side, can be used. It will be understood that strip 52 provides only marginal support to the outer edges of the plate(s) 46 and that the primary structural support and load-bearing capacity of the second bottom derives from the underlying reinforced concrete and sand layers.

Strips 52 serves to support the edge of the steel plate 46 in a position adjacent the vertical side wall of the cargo hold or tank. Strip 52 projects outwardly from the side wall 20 and provides a surface below the edge of the plate 46 that facilitates welding a fluid-tight seal between the plate and hull or side wall. Also shown in FIGS. 2 and 3 are welded joints 58 where the edge of plate 46 is joined to the bulkhead 20, and also along a seam intermediate the side walls where the edges of two steel plates are joined in abutting relation. Seals 50 are put in place prior to pouring of the concrete pad and prevent the concrete from contacting the vertical side walls.

With further reference to FIG. 2, there is shown in position on the interior surface of hull bottom 16 a flanged fitting 60 to which has been joined by appropriate fittings a length of vertical pipe 62 which passes through the layers of sand, reinforced concrete and extends in flanged opening 64 to a position above plate 46 which forms the second bottom. Fitting 60 and pipe 62 are encased in a framing box 66 which is held in place, as by weldments 68 and/or other reinforcing members 70 prior to placement of the sand in the bottom of the cargo hold. The positioning and arrangement of this supplemental piping 62 is employed when it has been determined that it is more practical and/or economical to utilize pipes and fittings that are already in place during the retrofitting of a tanker.

Figure 4:
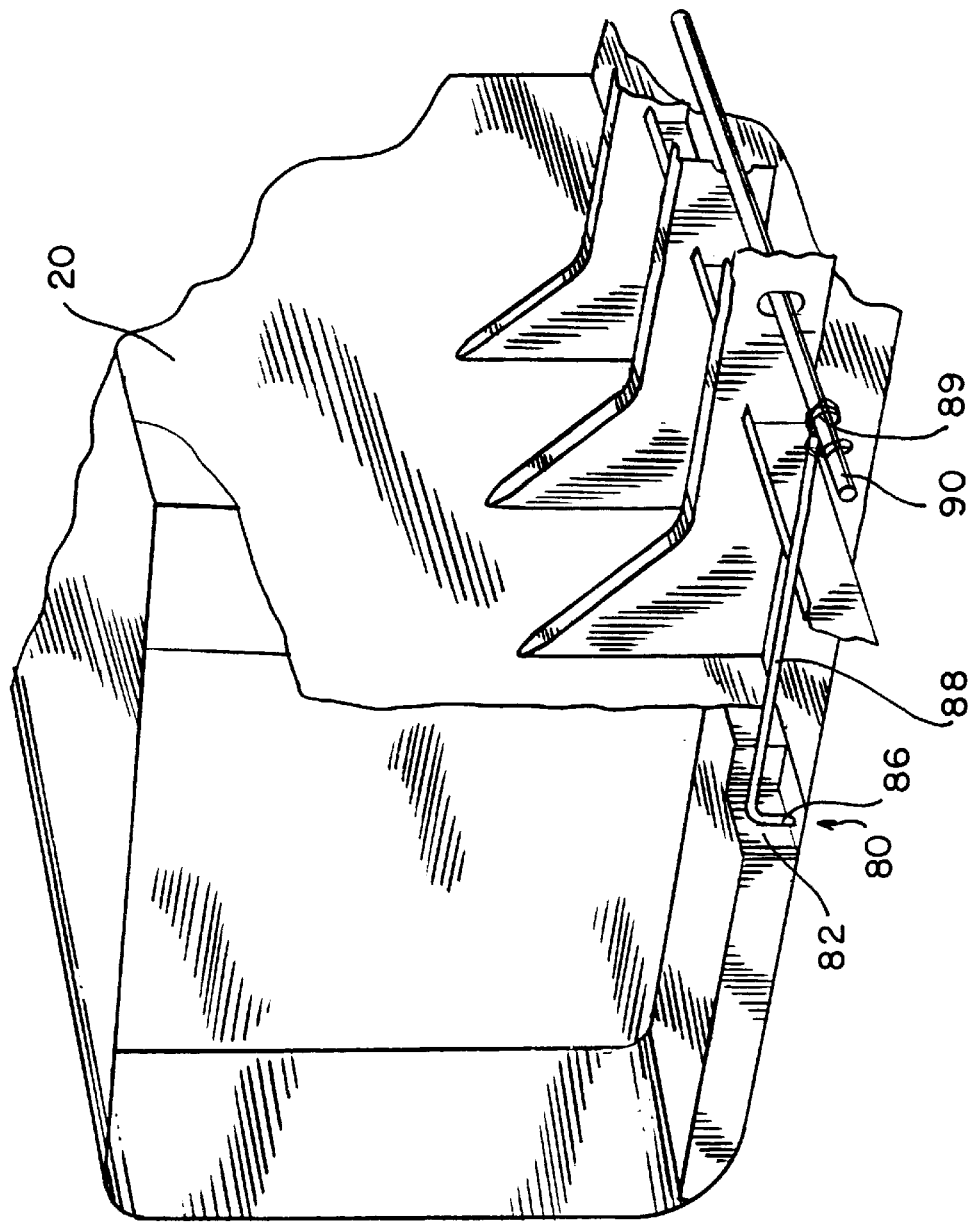
FIG. 4 is a cross-sectional view in perspective of a portion of a cargo hold and adjacent area of a tank ship illustrating another embodiment of the invention.

In another embodiment of the invention illustrated in FIG. 4, suction box 80 of welded steel plate construction has vertical sidewalls 82 surrounding existing bellmouth 86 positioned adjacent the bottom hull plate 16. Sidewalls 82 are secured, as by welding, between hull 16 and bottom plate 46. In the embodiment of FIG. 4, transfer piping 88 passes through wall 20 and is connected via a tee pipe fitting to main conduit 90 and is used for loading and unloading the tank. The suction box or well 80 is large enough to accommodate all existing pipes, valves, supporting structure and bell mouths.

In an alternative embodiment of the invention, existing piping, fittings, and the like are taken out of service, and either removed from the area in the cargo hold that will be below the second bottom, or sealed off and abandoned. In this embodiment of the invention, new fittings and piping, for example, a bellmouth for loading and discharging the liquid cargo, is installed above the level of the second bottom. Any piping, conduits or fittings passing through the side walls of the cargo hold or rising vertically from below the second bottom must be sealed to prevent the incursion of seawater in the event that the hull of the ship is pierced or otherwise fails in the vicinity of a conduit opening.

Once the structure of the invention has been installed, a piercing or failure of the hull in a region below the second bottom will not result in a discharge of the liquid cargo in the hold above the second bottom. In order to reduce the pressure or weight on the concrete and steel plates above a damaged outer hull, the crude oil or other liquid cargo is gravitated via pipelines to one or more designated empty ballast tanks until the hydrostatic pressure is equalized.

Based upon the same cost information and estimates applied above, and for an equivalent VLCC, the combined installation costs and projected freight revenue losses compare favorably to those of the alternative proposals discussed. For a comparable ship retrofitted in accordance with the invention, the cargo capacity loss is estimated at less than seven percent, which equates to about $1.2 million in lost annual freight revenues. The cost of installing the invention is estimated to be from about five-hundred thousand dollars to about seven-hundred and fifty thousand dollars, depending upon the size and configuration of the tanker.

What is claimed is:

1. A method of providing a second bottom to a cargo hold in a steel hull ship, said second bottom being supported without a steel structure, the method comprising:

a) applying a first layer of sand to the bottom of the ship's cargo hold over an area that is to be covered by a second bottom;

b) compacting the first layer of sand;

c) applying one or more additional layers of sand to the first layer of compacted sand;

d) separately compacting each of the one or more additional layers of sand after the layer has been applied;

e) applying a layer of reinforced concrete to the uppermost layer of compacted sand;

f) placing one or more steel plates on top of the cured layer of reinforced concrete and in abutting relationship with the side walls of the cargo hold, and/or with each other; and g) welding the one or more steel plates to the side walls of the cargo hold, and/or to each other in fluid-tight relation, to thereby provide a continuous second bottom to the cargo hold capable of supporting and retaining cargo placed in the cargo hold.

2. The method of claims 1 where the ship is a tanker ship for transporting liquid cargos and the cargo hold is a tank.

3. The method of claim 1 where the compacted sand has a depth of about two meters.

4. The method of claim 1 where the compacted sand has a depth that is equal to about 1/15th of the beam of the ship.

5. The method of claim 1 where the reinforced concrete is applied in a thickness of from about 150 mm to about 300 mm.

6. The method of claim 1 where the thickness of the steel plate is from about 5 mm to about 30 mm.

7. The method of claim 1 which includes the further step of securing a peripheral support strip to the side walls of the cargo hold above the surface of the compacted sand prior to applying the layer of reinforced concrete, whereby the upper surface of the support strip is even with the surface of the cured concrete.

8. The method of claim 1 which comprises the further step of providing a resilient oil-resistant seal between the reinforced concrete and the side walls of the cargo hold.

9. The method of claim 1 which further comprises forming expansion joints in the layer of reinforced concrete.

10. The method of claim 9 in which the expansion joints are filled with a resilient oil-resistant material that seals the joints against oil penetration.

11. The method of claim 1 which further comprises the step of first forming a suction well in the cargo hold, said suction well having vertical side walls extending to the level of the second bottom, and fitting and welding the steel plate to the vertical walls of the suction well, whereby the suction well is in fluid communication with the cargo hold above the second bottom.

12. The method of claim 1 where the cargo hold contains pipelines proximate the hull surface for conveying liquid cargo, and the method comprises the further step of installing pipelines for conveying liquid cargo above the surface of the second bottom.

13. The method of claim 1 where the second bottom covers about 30% of the projected bottom surface of the hull.

14. A double bottom construction for a steel hull ship, the double bottom extending from the interior surface of the hull to interior bulkheads, comprising:

a) a load-bearing layer of compacted sand in contact with the hull of the ship;

b) a layer of poured-in-place reinforced concrete on the surface of the layer of compacted sand;

c) steel plating in contact with the surface of the cured layer of reinforced concrete and in close-fitting relation with the hull and bulkheads;

d) weldments joining the steel plating to the hull and bulkheads in fluid-tight relation, whereby a second bearing bottom is rigidly supported without an underlying steel supporting structure.

15. The invention of claim 14 which further comprises a resilient impervious oil-resistant seal positioned proximate the hull and bulkheads and extending from the bottom to the top surface of the concrete layer, whereby the seal prevents the concrete from contacting the adjacent hull and bulkhead surfaces.

16. The invention of claim 15 which further includes a peripheral support strip secured to the hull and bulkheads and extending under the marginal edges of the steel plating.

17. The invention of claim 16 where the peripheral support strip is secured by welding.

18. The invention of claim 16 where the upper edge of the peripheral support strip is even with the surface of the concrete layer and supports the steel plating at a position spaced inwardly from the edge of the steel plating.

19. The invention of claim 14 where the steel plating is comprised of a plurality of separate steel plates welded at their abutting edges to form an integral, fluid-tight supporting surface.

20. The invention of claim 14 where the hull and bulkheads define a cargo hold for a liquid cargo.

21. The invention of claim 14 where the ship is a tanker vessel.

22. The invention of 21 which complies with Regulation 13G of MARPOL.

23. The invention of claim 21 in which the surface of the compacted sand is about two meters above the bottom hull of the ship.

24. The invention of claim 23 where the reinforced concrete is from about 150 mm to about 300 mm thick.

25. The invention of claim 23 where the steel plating is from about 5 mm to about 50 mm thick.

26. The invention of claim 14 where the second bottom is retrofitted into a tanker vessel that has previously been in service.

27. A ship constructed in accordance with the invention of claim 14.

28. The ship of claim 27 which is a tanker ship.

29. The ship of claim 28 which complies with Regulation 13G of MARPOL.

* * * * *